3,140,322
SELECTIVE CATALYTIC CONVERSION
Vincent J. Frilette, Erlton, N.J., and Paul B. Weisz, Media, Pa., assignors to Socony Mobil Oil Company, Inc., a corporation of New York
No Drawing. Filed Aug. 14, 1958, Ser. No. 754,915
14 Claims. (Cl. 260—667)

This invention relates to a novel method for conducting catalytic conversion processes with specific and unusual selectivity towards certain reaction paths, and for reacting certain specific compounds from a mixture of reactants. More particularly, the present invention is directed to a method for selectively conducting chemical reactions in the presence of a crystalline solid having both (a) rigid three-dimensional networks with interstitial dimensions such that only reactant or product molecules of suitable size and shape may be transported in either direction between the exterior phase and the interior thereof, and (b) catalytic activity located within the interior of the crystalline solid.

In particular, the method described herein is concerned with catalytic processing operations carried out in the presence of a solid, crystalline, zeolitic structure of very well defined intra-crystalline dimensions, which has the ability by reason of its intra-crystalline dimensions to allow the passage into or out of its crystalline cavities of only certain molecules, that is, of molecules having particular shape or size. By associating catalytic activity with the intra-crystalline spaces for the chemical reaction system which is to be catalyzed, only such conversion paths are obtained which involve reactant or product molecules of such specific shapes or sizes. Such zeolites wherein only molecules of particular size and shape are able to enter are sometimes known as molecular filters or molecular sieves.

In accordance with the method of the invention, catalytic selectivity is achieved by establishing catalytic reaction systems in which catalytically active surfaces are located within the intra-crystalline volume of substances which act as molecular sieves, and in which the sieve dimensions are in such relation to the chemical species involved in catalytic reaction that only selected species are allowed to pass the sieve structure.

Adsorbents which behave as molecular sieves have heretofore been utilized for effecting physical separation of mixtures of materials of varying molecular size. Such substances have been described by Barrer in several publications and in U.S. 2,306,610 and U.S. 2,413,134. Thus, molecular sieves are essentially the dehydrated forms of crystalline natural or synthetic hydrous siliceous zeolites containing varying quantities of sodium, calcium, and aluminum with or without other metals. All or a portion of the sodium or calcium ions normally contained in the molecular sieve structure may be zeolitically replaced with a number of various other ions. The atoms of sodium, calcium or metals in replacement thereof, silicon, aluminum and oxygen in these zeolites are arranged, in the form of an aluminosilicate salt in a definite and consistent crystalline pattern. This structure contains a large number of small cavities, interconnected by a number of still smaller holes or channels. These cavities and channels are precisely uniform in size. Chemically, these zeolites may be represented by the general formula:

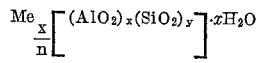

where Me is a metal cation, $x/n$ is the number of exchangeable cations of valence $n$, $x$ is also the number of aluminum atoms combined in the form of aluminate, $y$ is the number of silicon atoms and $z$ is the number of water molecules, removal of which produces the characteristic channel system. In the above formula, the ratio $y/x$ is a number from 1 to 5 and usually from 1 to 2. At the present time, there are commercially available molecular sieves of the "A" series and of the "X" series. A synthetic zeolite known as "Molecular Sieve 4A" is a crystalline sodium aluminosilicate having channels about 4 Angstroms in diameter. In the hydrated form, this material is chemically characterized by the formula:

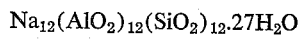

The synthetic zeolite known as "Molecular Sieve 5A" is a crystalline aluminosilicate salt having channels about 5 Angstroms in diameter and in which substantially all of the 12 ions of sodium in the immediately above formula are replaced by calcium, it being understood that calcium replaces sodium in the ratio of one calcium ion for two sodium ions. A crystalline sodium aluminosilicate which has pores or channels of approximately 13 Angstrom units in diameter is also available commercially under the name of "Molecular Sieve 13X." The letter "X" is used to distinguish the inter-atomic structure of this zeolite from that of the "A" crystal mentioned above. As prepared, the 13X material contains water and has the unit cell formula

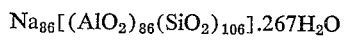

The parent zeolite is dehydrated to make the active catalyst. The 13X crystal is structurally identical with faujasite, a naturally-occurring zeolite. Faujasite, however, is not identical in composition with the 13X zeolite. The synthetic zeolite known as "Molecular Sieve 10X" is a crystalline aluminosilicate salt having channels about 10 Angstrom units in diameter and in which a substantial proportion of the sodium ions of the 13X material have been replaced by calcium.

Molecular sieves of the "A" series consist fundamentally of a three-dimensional structure of tetrahedral silicon and aluminum. These tetrahedra are joined by sharing oxygen atoms in such a manner that the ratio of atoms of oxygen to the total number of atoms of aluminum and silicon is equal to two. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, Ba, $Na_2$, $K_2$ or $Li_2$ is equal to unity. One cation may be exchanged either in entirety or partially by another cation utilizing ion exchange techniques as discussed hereinbelow. The spaces between the tetrahedra are occupied by molecules of water prior to dehydration.

Molecular sieve of the "A" series are ordinarily prepared initially in the sodium form of the crystal. The sodium ions in such form may, as desired, be exchanged for other cations. In general, the process of preparation involves heating in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product, which crystallizes within this hot mixture is separated therefrom and water washed until the water in equilibrium with the zeolite has a pH in the range of 9 to 12. After activating by heating until dehydration is attained, the substance is ready for use.

The empirical formula for the zeolites utilized herein can be expressed as:

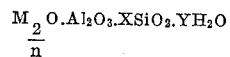

where M is a metal and $n$ its valence. A specific crystalline zeolite has values of X and Y within a definite range. The value of X for any specific zeolite varies in a certain manner depending on whether aluminum or silicon atoms occupy equivalent positions in the lattice. For molecular sieves of the "A" series, X has an average value of $1.85 \pm 0.5$. The value of Y, depending on the condition of hydration and on the metal cation present may vary from 6 to 0. The average value of Y for the completely hydrated sodium zeolite of the "A" series is 5.1. In the above general formula, the ratio $Na_2O$ to $Al_2O_3$ is equal to 1. However, if during the process of preparation, excess of the base present in the mother liquor is not eliminated by washing of the crystalline precipitate, analysis will show a ratio slightly greater than 1. On the other hand, if the washing is excessive a certain amount of exchange of the sodium with hydrogen ions may take place bringing the aforementioned ratio to slightly less than 1. The ratio $$\frac{M_2O}{n} \text{ to } Al_2O_3$$

in the above general formula may accordingly be defined more accurately as being $1 \pm 0.2$.

Suitable reagents in the preparation of the sodium zeolite of the "A" series include silica gel, silicic acid, or sodium silicate as sources of silica. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the following ranges $SiO_2/Al_2O_3$ of 0.5 to 2.5, $Na_2O/SiO_2$ of 0.8 to 3.0 and $H_2O/Na_2O$ of 35 to 200. The reaction mixture is placed in a suitable vessel which is closed to the atmosphere in order to avoid losses of water and the reagents are then heated for an appropriate length of time. A convenient and generally employed process of preparation involves preparing an aqueous solution of sodium aluminate and sodium hydroxide and then adding with stirring an aqueous solution of sodium silicate. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. For temperatures between room temperature (21° C.) and 150° C. an increase in temperature increases the velocity of the reaction and thus decreases its duration. As soon as the zeolite crystals are completely formed they retain their structure and it is not essential to maintain the temperature of the reaction any longer in order to obtain a maximum yield of crystals.

After formation, the crystalline zeolite is separated from the mother liquor, usually by filtration. The crystalline mass is then washed, preferably with distilled water, and while on the filter, until the wash water, in equilibrium with the zeolite, reaches a pH of 9 to 12. The crystals are then dried at a temperature between 25° C. and 150° C. Activation is attained upon dehydration.

As indicated hereinabove, the sodium ions of the above zeolite may be replaced partially or completely by other cations. These replacing ions include other monovalent or divalent cations such as lithium and magnesium, metal ions of the first group of the Periodic Table such as potassium and silver, metal ions of the second group such as calcium, and strontium, metal ions such as nickel, cobalt, iron, zinc, mercury, cadmium, gold, scandium, titanium, vanadium, chromium, manganese, tungsten, yttrium, zirconium, niobium, molybdenum, halfnium, tantalum, and other ions such as ammonium which, with the sodium zeolite of the "A" series, react as metal in that they replace sodium ions without occasioning any appreciable change in the fundamental structure of the crystalline zeolite. Replacement is suitably accomplished by contacting the crystalline sodium aluminosilicate zeolite with a solution of an ionizable compound of the ion which is to be zeolitically introduced into the molecular sieve structure for a sufficient time to bring about the extent of desired introduction of such ion. After such treatment, the resulting exchanged product is water-washed and dried and thereafter is ready for use. The extent to which exchange takes place can be controlled. Thus, taking the exchange of sodium for calcium as a typical example, such exchange can be effected in a proportion of less than 5% up to 100%. One method of regulation of the degree of exchange consists of impregnating a known amount of the sodium zeolite with solutions containing determined amounts of exchangeable ions. In contacting the sodium zeolite of the "A" series and calcium ions, whenever the total available calcium in the solution is 5% of the quantity which could enter in the zeolite if all the sodium ions were to be replaced, effectively 5% of the sodium ions are replaced after about 20 minutes contact at room temperature. When the exchange solution contains 60% of the theoretical amount of the calcium ions necessary to a complete exchange, approximately 47% of the sodium ions are replaced in about 20 minutes at room temperature. By using a three-fold excess of the amount of calcium theoretically necessary to obtain a complete exchange, a replacement of about 77% of the sodium ions is obtained in 20 minutes at room temperature. A more complete exchange can be effected if the temperature of contact is raised to 100° C. or if the exchange operation is repeated several times by replacing the used solution with a freshly formed solution. In such manner, a sodium zeolite of the "A" series may have all of its sodium replaced by calcium.

Sodium zeolite of the "A" series exchanged with calcium or magnesium possesses larger pores than the unexchanged material. An unusual characteristic of the calcium or magnesium exchanged zeolites is that the opening of the pores is not accomplished progressively as the sodium ions are replaced by calcium ions but is produced within a fairly narrow range of composition. When the exchange is 25% or less, the substance possesses substantially the same pore characteristics as the sodium zeolite of the "A" series, namely a pore diameter of about 4 Angstrom units. However, when the exchange exceeds 40%, the pore characteristics become those of the calcium and magnesium zeolites of the "A" series, i.e., a pore diameter of about 5 Angstrom units. This remarkable effect is evident, for example, by the amount of heptane adsorbed on the sodium zeolite of the "A" series with increasing replacement of the sodium ions therein with calcium as shown below:

| Percent of Sodium Ions Replaced in Molecular Sieve 4A by Calcium Ions | Wt. percent Heptane Adsorbed at 25° C. Under 45 mm. of Mercury |
| --- | --- |
| 0 | 0.1 |
| 10 | 0.1 |
| 25 | 1.3 |
| 40 | 13.8 |
| 70 | 15.5 |
| 100 | 16.5 |

As noted hereinabove, there are numerous forms of zeolites of the "A" series having exchanged ions. While, generally, the substances having a divalent exchanged ion such as zinc, nickel and strontium zeolites, have pore size characteristics analogous to those of calcium and magnesium of the "A" series, the exact pore size will differ. Such property can be advantageously employed in the process of the present invention in affording control of pore size by suitable selection of a particular cation. Similarly, the substances having a monovalent ion such as lithium and silver zeolites of the "A" series, have pore size characteristics similar to the sodium zeolite of such series, but the precise pore size is subject to similar control and selection.

Molecular sieves of the "X" series are characterized by the formula:

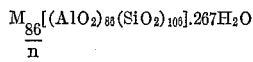

where M is Na+ or Ca++ or other ions introduced by replacement thereof and *n* represents the valence of the cation M. The molecular sieves of this series are chemically different from but structurally similar to the mineral faujasite. The structure consists of a complex assembly of 192 tetrahedra in a large cubic unit cell 24.95 A. on an edge. The effective pore diameter is 10 to 13 A. and the adsorption volume is about 0.35 cc./gram of dehydrated zeolite.

For molecular sieves of this series, in the empirical formula:

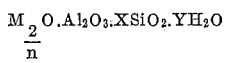

X has an average value of 2.5±0.5. The value of Y, depending on the condition of hydration and on the metal cation present may vary from 8 to 0. The average value of Y for the completely hydrated sodium zeolite of the "X" series is 6.2.

Molecular sieves of the "X" series are prepared in a manner similar to that described hereinabove for preparation of molecular sieves of the "A" series. However, for synthesis of the "X" series molecular sieves, the reaction mixture has a composition, expressed as mixtures of oxides, within the following limits: $SiO_2/Al_2O_3$ or 3 to 5, $Na_2O/SiO_2$ of 1.2 to 1.5 and $H_2O/Na_2O$ of 35 to 60.

In general, for the separation of $C_4$–$C_{14}$ normal paraffins from isoparaffins and/or cycloparaffins and/or aromatic hydrocarbons of substantially the same boiling range, it has previously been found that molecular sieves having channels about 5 Angstroms in diameter give satisfactory separation. Thus, the channels of the molecular sieve have diameters approximating the smallest dimension of the molecules of the normal paraffins to be sorbed by the sieve. Accordingly, the sieve retains the normal paraffins, n-pentane and n-hexane when a $C_5$–$C_6$ fraction of naphtha is treated and does not retain or sorb molecules of greater than minimum diameter, for example, cyclopentane, cyclohexane, isopentane, benzene, and the like. Both naturally occurring and synthetic zeolites have heretofore been employed for effecting selective separation or adsorption. Natural zeolites used have included, for example, chabazite, mordenite, analcite, lebrynite, and natrolite.

There are two types of selective catalytic processing operations which can be accomplished by application of the principles of this invention; it will be helpful to characterize these broadly, and to subsequently illustrate them by examples:

(1) In a reactant mixture containing the materials A, B, and c which would normally react catalytically to give the respective products A′, B′, and c′, it is possible to selectively provide reactivity only for the reaction c→c′ by incorporating the catalytic sites within surfaces accessible only through openings of a size which will allow c and c′ to pass, but will not be penetrable by A and B. This type of system will be referred to as the reactant-selective system. It is illustrated by writing the set of possible catalytic reactions which would normally be capable of proceeding, but wherein only one specific reactant, as well as its reaction product c′ is capable of passing to and from the solid particle; which is indicated by the use of the lower case letter c in contrast to capital letters for the species which are too large to pass as indicated by the following:

The net reaction which will selectively proceed is indicated by the box. In principle, of course, there may be any number of possible simultaneous reactions, as well as the ability to select more than one specific net reaction.

(2) In a process which normally transforms a species a into alternate products b, C, D, etc., the reaction to from only, say b, may be catalyzed wherein a and b molecules are of a size smaller than C and D and the catalyst base filter-dimension is chosen to pass only a and b.

This type of a reaction system will be referred to as the product selective system. It is best illustrated by one or both of the following sets of reaction schemes:

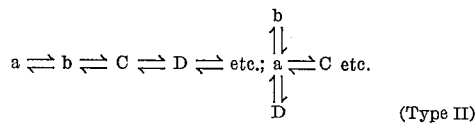

Again, molecular species are indicated in the lower case when they are small enough to pass the structure, or as capital letters when they are not.

This embodiment of the invention is based on the very important recognition that some of the reaction products, like C and D, can be produced within the crystal chamber, until their concentration approaches their thermodynamic equilibrium value within the chambers, but that nevertheless no net production rate, as regards the external user, will or can proceed because of size restriction.

An important feature of the method of this invention is the provision of suitable catalytic activity within the intracrystalline structure in conjunction with the catalytic reaction system desired. This may be accomplished by various methods:

Catalytically active materials may be introduced into the crystal lattice by suitably contacting the zeolitic solids with solutions containing catalytically active components such as zinc, cobalt, nickel, silver, and others. In this manner, a catalytically active element can be introduced by deposition of the incoming metal on the zeolitic solid after drying the solution from the crystalline carrier. Often, establishment of catalytic centers can be effectively achieved by exchanging a portion of the metal (Me in the general formula noted hereinabove) ion of the zeolite with an ion exhibiting catalytic activity for the desired conversion. Thus, for example, a portion of the sodium or calcium ions normally contained in the molecular sieve structure may be zeolitically replaced with a number of various other ions such as silver, copper, aluminum, hydrogen, zinc, strontium, cobalt, gold, potassium, nickel, ammonium, cadmium, mercury, lithium, and magnesium. Replacement is suitably accomplished by contacting the molecular sieve with a solution of an ionizable compound of the ion which is to be zeolitically introduced into the molecular sieve structure for a sufficient time to bring about the extent of desired introduction of such ion. After such treatment, the molecular sieve is water-washed and calcined and thereafter is ready for use.

As the internal catalytically active species it may be desired in certain cases, to use an intrinsic catalytic activity possessed by the zeolite itself. In a copending application Serial No. 763,433 filed September 26, 1958, there are described some types of chemical activities which have been discovered to be possessed by some of the zeolite materials. Accordingly, by the use of this invention we can effect size selective catalytic reactions by the proper choice of the type and geometric crystal lattice dimensions of the zeolite, in combination with certain processing conditions.

The following examples will serve to illustrate selective catalytic conversion as achieved in accordance with the present invention.

EXAMPLE 1

This example demonstrates that, with a conventional dehydration catalyst, the dehydration of normal butanol and of iso-butanol proceed with similar effectiveness. With a catalyst using the molecular filter principle of this invention, selective dehydration of normal butanol can be obtained. This constitutes an example of a reactant selective system of Type I, as illustrated further above, specifically represented by:

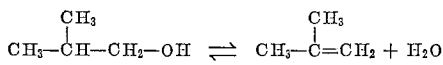

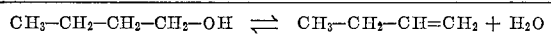

As a conventional dehydration catalyst, a silica-alumina gel composite containing 10 percent by weight of alumina and 90 percent by weight of silica, and characterized by a surface area of 100 square meters per gram and an average pore diameter of about 150 Angstroms was employed.

A geometrically selective catalyst was prepared from a commercial synthetic zeolite known as "Molecular Sieve 5A" and marketed by Linde Air Products Company. This molecular sieve which chemically is a calcium aluminum silicate having channels about 5 Angstroms in diameter was pelleted in an amount of 66.5 grams. The pelleted material was then treated with an aqueous solution of 26.6 grams of $NH_4NO_3$ dissolved in 1 gallon of water. The purpose of this treatment was to introduce catalytically active acidity to replace calcium. Thus, the final product analyzed 9.08 percent calcium as compared with 9.95 percent calcium for the starting material. The pellets, after treatment, were rinsed with distilled water and thereafter calcined at 650–700° F. for several hours in a stream of nitrogen.

Normal butyl alcohol vapors were passed at a liquid hourly spaced velocity of 1 over each of the above catalysts at elevated temperatures. The alcohol was effectively dehydrated to butene and water over each of the catalysts, the extent of dehydration being substantially the same in each instance.

When isobutyl alcohol vapors were passed at a liquid hourly space velocity of 1 over a new charge of each of the above catalysts at elevated temperatures, dehydration occurred to an appreciable extent with the conventional silica-alumina catalyst but with the geometrically selective catalyst, little or no dehydration was realized.

The extent of dehydration obtained in each case is shown in Table I below:

*Table I*

| Temp.° F. | Mol Percent Dehydration | | | |
|---|---|---|---|---|
| | n-Butanol | | Isobutanol | |
| | S.A.[1] | G.S.[2] | S.A.[1] | G.S.[2] |
| 425±5 | 19 | 18 | 36 | 0 |
| 450±5 | 36 | 25 | 38 | 0 |
| 475±5 | 58 | 61 | 63 | 4 |

[1] S.A.=Silica-alumina gel (10+ $Al_2O_3$—90% $SiO_2$) catalyst.
[2] G.S.=Geometrically selective catalyst.

It will be seen from the foregoing that, where n-butanol was the charge, the molecules could readily pass into the pores of either of the catalysts employed and thereby undergo dehydration to butene. On the other hand, where isobutanol was the charge, the molecules underwent dehydration with a conventional silica-alumina catalyst but were too large to enter the pores of the geometrically selective catalyst with the result that such molecules were excluded from contact with the catalytic surface contained within the pores of the geometric structure and little or no dehydration was accomplished. Thus, with a charge consisting of a mixture of n-butanol and iso-butanol, only the n-butanol reactant would undergo dehydration to butene utilizing the geometrically selective catalyst described hereinabove. Such will be apparent from the following example:

EXAMPLE 2

A 1:1 molar mixture of normal and isobutyl alcohols was passed over a new charge of the geometrically selective catalyst described in Example 1 at a temperature of 475° F. and a liquid hourly space velocity of 1. The unconverted product (liquid) consisted of a mixture of 10.6 mol percent n-butanol and 86.6 mol percent isobutanol. These results along with those obtained under identical reaction conditions using a non-geometrically selective silica-alumina catalyst as described in Example 1 are summarized in Table II:

*Table II*

| | G.S.[2] Catalyst | | S.A.[1] Catalyst | |
|---|---|---|---|---|
| | n-Butanol | Isobutanol | n-Butanol | Isobutanol |
| Composition fed to reactor, grams | 4.2 | 4.7 | 4.3 | 4.8 |
| Alcohols in recovered liquids, grams | 0.6 | 4.7 | 1.9 | 1.6 |
| Removal of alcohols by dehydration | 3.6 | 0.0 | 2.4 | 3.2 |

[1,2] See footnotes at bottom of Table I.

As will be seen from the above data, selective conversion of n-butanol to butene in the presence of isobutanol was achieved utilizing the geometrically selective catalyst wherein the active catalytic surfaces were contained within a molecular sieve.

EXAMPLE 3

This example is another illustration of reactant selective reactivity. It deals with reactions involving dehydration of propyl and isopropyl alcohols, i.e.:

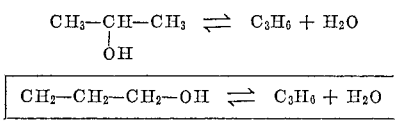

wherein the secondary alcohol, by virtue of its larger minimum size due to the hydroxyl side branch, is discriminated against by the combination of catalytic reactivity and size selective structure of the zeolite catalyst. This example illustrates, generally, the selective dehydration of a normal alcohol where the charge is a mixture of primary and secondary alcohols. It is known that a secondary alcohol dehydrates more readily than the corresponding primary alcohol. This behavior will be seen from Experiment A below wherein a mixture of one part normal propyl alcohol and one part isopropyl alcohol was partially dehydrated at a temperature of 442° F. over a conventional silica-alumina catalyst (10% $Al_2O_3$ and 90% $SiO_2$) having an activity (CAT–A) of 46. In this experiment, no isopropanol was detected in the unreacted portion of the product stream.

A similar experiment, substituting an equal volume of a geometrically selective catalyst (Molecular Sieve 5A) for the above silica-alumina catalyst had a substantial amount of isopropanol in the condensed, unreacted liquid. This residue of isopropanol resulted from the selective dehydration of the normal propyl alcohol, in contrast with the usual behavior illustrated by Experiment A. The comparative results obtained in each instance are set forth below:

| Experiment | Catalyst | Temp., °F. | Grams Reactant per cc. Catalyst per Hour | Isopropanol in Unreacted Product, wt. percent |
|---|---|---|---|---|
| A | Silica-Alumina | 442 | 1.2 | 0 |
| B | 5A Molecular Sieve | 455 | 1.1 | 26 |

The selective catalytic conversion method described herein is applicable to a large variety of chemical reactions. Thus, it is contemplated that the method may be utilized to selectively dehydrate normal alcohols of 3 to 6 carbon atoms from a mixture of normal and iso-alcohols by bringing such mixture at a temperature of between about 200° F. and about 650° F. into contact with a molecular sieve bearing catalytically active dehydration surfaces and having uniform interstitial dimensions sufficiently large to admit the normal alcohol component but sufficiently small to exclude the iso-alcohol component, thereby forming a resulting dehydration product of a normal olefin having the same number of carbon atoms as the normal alcohol reactant.

EXAMPLE 4

This example illustrates a further embodiment of the present invention in a reactant selective catalytic conversion process. It deals with the selective catalytic cracking of normal paraffins in contrast to that of isoparaffins. Normally, cracking rates of iso-paraffins are comparable, and can even be greater than those obtained with normal paraffins. However, this invention affords a distinct selectivity to the cracking of the normal paraffins.

The sample reaction used in this example is illustrated by:

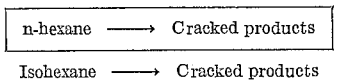

Isohexane ⟶ Cracked products

The cracking conversion of n-hexane was compared with that of 3-methyl-pentane, over both conventional catalyst of 46 Activity Index silica-alumina catalyst (containing 10 weight percent Al₂O₃ and 90 weight percent SiO₂), and over the "5A" molecular filter type zeolite. A conventional atmospheric pressure reactor was used, operating at 930° F., at 1 LHSV, and the results are summarized below:

| Catalyst | Conversion percent | |
|---|---|---|
|  | n-Hexane | 3-Methyl-pentane |
| Silica Alumina | 10.7 | 22.7 |
| 5A Molecular Sieve | 10.2 | 1.0 |

It will be noted that an essentially complete catalytic differentiation is made for the two reactants.

In this example, use has been made of the intrinsic catalytic activity for hydrocarbon cracking of the zeolite itself. While the discovery of such intrinsic activity is more fully described in co-pending patent application, Serial No. 763,433 filed September 26, 1958, it should be noted that in the case of the present invention it is important to combine such intrinsically possessed activity of this type of zeolite with the proper choice of crystallographic dimensions. This is well demonstrated by measurements which have been performed on other zeolites, which, while possessing intrinsic cracking activity as described in the aforementioned copending application, do not possess the interstitial dimensions leading to size specificity.

The cracking conversion of the same charge materials noted above, normal hexane, and 3-methyl-pentane have been measured under the same reaction conditions as in the case directly above, but using as a catalyst a crystalline alumino-silicate which has interstitial dimensions of approximately 13 Angstrom units. This material is available commercially under the name of Molecular Sieve 13X. The large channel dimensions of this zeolite allows passage of the above-mentioned paraffins without noticable discrimination. The results of the conversion data are shown below:

Catalyst: Conversion percent
13X Molecular Sieve—
  n-Hexane _____ 17.6
  3-Methyl-pentane _____ 21.7

EXAMPLE 5

This example extends the results demonstrated in the previous example, to show the selective cracking activity on a normal paraffin which is obtainable when a complex mixture of hydrocarbons is charged to such a cracking process. A charge stock containing seven hydrocarbon components was charged over 5A zeolite as catalyst at 1000° F. and .5 LHSV in a glass reactor of standard design, at atmospheric pressure. The remaining concentration of each component was then measured, and compared with the charge stock composition. A run with inert Vycor chips replacing the catalyst was also made to establish the magnitude of conversion ascribable to thermal, i.e., noncatalytic reactions. The results are listed below:

|  | Charge Stock (g./100 g. Charge) | Reaction Products With 5A Molecular Sieve (g./100 g. Charge) | Reaction Products With Vycor Chips (g./100 g. Charge) |
|---|---|---|---|
| n-Hexane | 27.1 | 15.4 | 28.1 |
| 2 methyl pentane | 26.7 | 26.6 | 29.5 |
| 2 methyl pentane | .18.9 | 21.3 | 23.9 |
| 2, 2-dimethyl butane | 3.7 | 3.5 | 2.9 |
| 2, 3-dimethyl butane | 5.2 | 4.5 | 4.6 |
| Methyl cyclopentane | 5.6 | 3.9 | 4.5 |
| Cyclohexane | 0.1 | 0.1 | 0.1 |
| Benzene | 6.6 | 5.2 | 5.4 |

The selective cracking of normal hexane over the 5A Molecular Sieve is clearly seen. The small changes in the concentration values of some of the minor components are consistent with a small background of thermal reaction, and with the finite errors of analysis inherent in a study of a complex hydrocarbon mixture.

EXAMPLE 6

In order to illustrate the breadth of applicability of the present invention, the following example is recited, showing the use of a zeolitic structure having approximately 10 to 13 Angstrom channel dimensions into which hydrogenation activity has been introduced. This material is a (synthetic) faujasite of the "X" crystal variety. As can best be seen from inspection of molecular models, the dimension of 10 Angstrom units approaches the molecular size of polysubstituted aromatic ring compounds. Following the teachings of this invention, a zeolite structure containing hydrogenation activity, as was created by the introduction of the element platinum into the crystal chambers, can be used to selectively hydrogenate organic compounds having a molecular size capable of passing a channel dimension of about 10 Angstroms, while larger molecules will not take part in such process. In the present example, we have measured the conversion of benzene, and of tri-ethyl benzene with hydrogen.

Five grams of catalyst were contacted with 8.5 grams of benzene, or triethyl benzene, in a shaker-bomb, and with hydrogen at an initial pressure of 30 p.s.i.g., under constant agitation. The rate of uptake of hydrogen was measured in each case, and the results are summarized below, for a conventional preparation of platinum supported on silica gel, for platinum contained in X-type zeolite having pore dimensions of about 13 Angstroms, and another platinum-containing zeolite of the X-type having pore dimensions of about 10 Angstroms:

| Catalyst | Moles of Aromatic Converted per hr. per Gram Catalyst ($\times 10^3$) | |
|---|---|---|
| | Benzene | Triethylbenzene |
| Pt on SiO$_2$ | 21.4 | 17.4 |
| Pt in 13 X zeolite | 4.8 | 1.0 |
| Pt in 10 X zeolite | 4.0 | .2 |

The discriminatory action of the Pt-zeolite systems is well demonstrated, and becomes increasingly striking for the catalyst systems having 13 and 10 Angstrom pore dimensions.

The teachings of this invention are applicable to many and various instances of desired selective hydrogenation processing. Aside from platinum used as the active component within the zeolitic structures, we may use other elements and complexes known to have hydrogenation activity such as other elements of the platinum or palladium group, transition group metals such as nickel, cobalt, and the like. Selective hydrogenation of either double-bond or aromatic bond units may be practiced selectively in a very large number of possible mixtures of organic molecules. In general, for selectively among large cyclic or polycyclic molecules the X-type zeolite will be most often useful, while for smaller molecular species to be hydrogenated, the A-type crystal may be more useful when combined with a hydrogenation component as noted above. Thus, for example, in the production of isoprene and its subsequent use in rubber synthesis it is extremely desirable to remove side-product impurities such as piperylene. Now, the removal of this impurity may be accomplished by the methods of this invention according to the following:

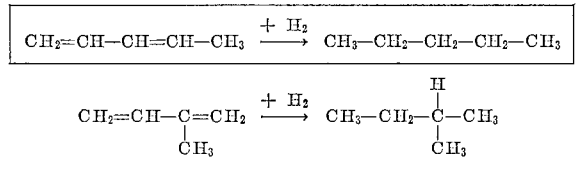

by providing hydrogenation conditions in the presence of a size selective zeolite imparted with hydrogenation activity, such as for example Ni-containing A-type zeolite. Isoprene by virtue of its branched structure is unable to reach the sites of catalytic hydrogenation, while the straight chain piperylene will be hydrogenated, thereafter being separable by simple processes or be rendered ineffective as a mere inert component of the isoprene reactant stream.

It is obvious that many other illustrations of specific embodiments of reactant-selective catalytic systems could be cited.

Examples below are given to illustrate the second broad class of catalytically selective processes to which the present invention may be applied, namely the class of product selective catalytic reactions.

EXAMPLE 7

This example illustrates the principle of geometric selectivity for reaction products. A charge of hexene-1 was catalytically cracked by passing the same at a specified elevated temperature and a liquid hourly space velocity of 1 over catalyst. It is well known in the cracking art that conventional cracking catalysts, such as silica-alumina, produce a very large proportion of iso-paraffins and iso-olefins among the products. With the geometrically selective catalyst, however, isomerized product molecules made in the cracking step may not emanate from the catalyst particles, so that the user of such a novel catalyst system will be able to obtain only normal aliphatic structures as major product components. Thus, while other products may form in the interior, when cracking hexene-1, which is the reactant in this example, only straight chain products such as methane, propylene, ethylene, ethane, n-butane and n-butene are capable of removal from the pores and accordingly these are the constituents that predominate in the products obtained from the run utilizing the geometrically selective catalyst.

For the example of hexene cracking, the reaction Type II, noted hereinabove, is applicable, which in specific and abbreviated form is represented by:

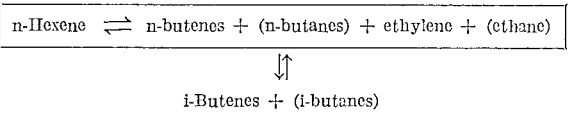

and analogous formulae for the splitting into other fragments. Again, the boxed reaction participants are those which alone can pass between the catalytic sites and the outside environment. The geometrically selective catalyst was prepared as described in Example 1. For comparison, a typical silica-alumina cracking catalyst (10 weight percent Al$_2$O$_3$ and 90 weight percent SiO$_2$) having a cracking activity (CAT-A) of 46 was used in a second run.

The gaseous products from both runs were analyzed by mass spectrometer. The results obtained are shown in the following table:

Table III

| | G.S.[1] Catalyst | Silica-Alumina Cracking Catalyst |
|---|---|---|
| Temperature, °F | 795 | 778 |
| Wt. Percent Conversion to Gas | 32 | 53 |
| Mol Percent Hydrogen | 4.9 | 1.1 |
| Mol Percent Methane | 12.4 | 5.7 |
| Mol Percent Ethylene | 9.8 | 6.0 |
| Mol Percent Ethane | 8.3 | 3.6 |
| Mol Percent Propylene | 32.6 | 16.2 |
| Mol Percent Propane | 9.3 | 14.2 |
| Mol Percent Isobutane | 1.7 | 34.3 |
| Mol Percent Butenes | 9.2 | 5.0 |
| Mol Percent n-Butane | 2.5 | 1.8 |
| Mol Percent Misc | 9.3 | 12.1 |
| | 100.0 | 100.0 |

[1] G.S. = Geometrically selective catalyst.

It will be seen from the above results that the usual high ratio of iso-to-normal isomers obtained upon conventional cracking of hexene was approximately inverted by the selective action achieved with the geometrically selective catalyst.

EXAMPLE 8

This example deals with the cracking of a paraffin with product-selectivity toward only normal molecular product structures. When a normal paraffin undergoes cracking within the "A"-type zeolite crystal, again only normal paraffinic or olefinic products are capable of escaping the structure. In co-pending application, Serial No. 763,433, filed September 26, 1958, there is described, among other things, the finding that the calcium zeolite form of the aluminosilicate zeolites possess paraffin cracking activity. The A-type crystal, having channel dimensions of about 5 Angstrom units, can accordingly be used to crack paraffin hydrocarbons with the result that only normal cracked products are obtained. This is strikingly demonstrated by an analysis, by vapor chromatography, of the gases from a run in which n-hexane was cracked over 5A zeolite, as reported above in Example 4, with a resulting conversion of 10.2 percent of the hexane. The concentrations of the gaseous components observed are reported below:

C₆ CRACKING—GAS COMPOSITIONS

| | |
|---|---|
| Catalyst | 5A |
| Charge | n-C₆ |
| Temp. (° F.) | 930 |
| LHSV | 1.0 |
| Isobutenes | 0.8 |
| Normal butenes | 7.1 |
| Isobutane | 0 |
| Normal butane | 1.2 |
| Isopentane | 0 |
| Normal pentane | 11.4 |
| Pentenes | 0 |

It will be seen from the foregoing that the normal C₄ and C₅ cracked products were, in each instance, selectively obtained over the corresponding iso compounds.

As indicated by the above discussion of the Type II reaction scheme, $$a \rightleftharpoons b \rightleftharpoons C \rightleftharpoons D \rightleftharpoons etc$$

it is contemplated to use the present invention to control the extent to which successive reactions will proceed, such as polymerization or condensation reactions which normally proceed to products of ever increasing molecular weights, and therefore increasing molecular dimensions, were it not for the use of the size limiting feature of the reaction scheme of this invention. The following is an example of the successful suppression of what would in conventional practice lead to excessive conversion to such polymeric products:

EXAMPLE 9

It is well known that alpha-piene may be isomerized at reflux (ca. 154° C.) over solid catalysts such as chromia-alumina and clays to form various terpene isomers and polymers. The isomerization may be represented by:

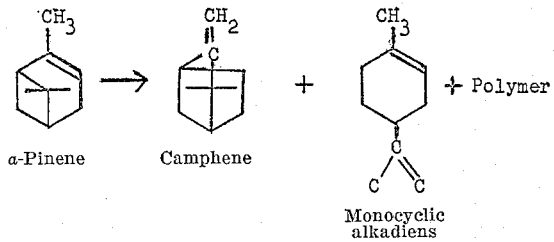

In this process, when conventionally practiced, however, the fraction of the reactant which transforms into high molecular weight polymeric material is very large. For example, conversion of 15 percent to 35 percent of the pinene to polymer after several hours' reflux are customarily obtained, as reported by Wystrach et al., J.A.C.S. 79, 5786, November 5, 1957.

Now, as described in co-pending application Serial No. 763,433, filed September 26, 1958, Molecular Sieve 10X will catalyze the isomerization of the pinenes. The calcium zeolite having about 10 Angstrom units channel dimensions can therefore be used to process pinenes with considerable suppression of polymer formation.

One hundred and sixty grams of alpha-pinene was refluxed with six grams of the 10X zeolite for five hours. The products, and unreacted pinene were then removed by steam distillation. Conversion of alpha-pinene was determined by infra-red analysis of the distillate, and the percentage of non-distillable polymer was obtained. Similarly, a run was made using 1.6 grams of dry Attapulgus Fuller's Earth clay, in contact with 160 grams of alpha-pinene, and subjected to the same type of evaluation. The following results were obtained:

| Catalyst | Percent Pinene Converted | Percent Polymer Formed |
|---|---|---|
| Attapulgus Clay | More than 90 percent | 12 |
| Size-selective zeolite | do | 4 |

The advantage of using the size-selective catalyst system for achieving product selectivity is thus well demonstrated.

The invention teaches general methods for converting chemical substances catalytically under conditions which impose selectivity of reaction paths by virtue of providing catalytically active sites within crystalline substances the interstitial dimensions of which will selectively pass or reject certain molecules. It teaches the use of this principle for selecting specific reactants from a mixture thereof, as well as for directing the reaction towards net production of only specific species.

The examples given above illustrate the methods of the invention as well as define specific embodiments contemplated. As regards reactant selective systems, there has been shown application to the cracking of substantially only normal aliphatic hydrocarbons in the presence of other hydrocarbons such as isoparaffins, iso-olefins, naphthenic and aromatic hydrocarbons. There has also been shown the selective dehydration of normal alcohols from a mixture of normal and iso-alcohols. Likewise, it is within the contemplation of this invention, to carry out other dehydration reactions of linearly shaped molecules in contrast to admixtures of non-linear structures.

Analogously, other decomposition reactions may be carried out involving substituted groups on hydrocarbons selectively with respect to end-group substitutions, such as dehydrohalogenation of hydrocarbons of linear structure with terminal halogen group or groups. Or selective hydrolysis of mono-halo-aliphatic structures may be effected such as, for example, 1-chloro-pentane from a mixture of various chloro-hydrocarbons. For example, in one method for synthesizing of amyl-alcohol, pentanes are normally chlorinated to yield a mixture of mono-chloro pentanes, which subsequently are hydrolyzed to various amyl-alcohols, containing primary, secondary, tertiary, and iso-pentyl alcohols. An application of the present method to the hydrogenolysis step would afford a method for the selective production of only normal primary amyl-alcohol. Similarly, it is within the scope of this invention to carry out the chlorination of the paraffin with resultant selective production of only 1-chloro-pentane.

The application of the invention for size selective hydrogenation of certain aromatic compounds of limited size has been demonstrated. The same size-selective hydrogenation method may be applied to other mixtures of organic compounds where it is desired to selectively hydrogenate acetylenic, olefinic, or aromatic bonds in compounds which have a molecular size smaller than approximately 10 A. units, with relatively little effect on other components of larger molecular size, by the use of the "X" type zeolite crystal as a catalyst base. For example, alkylbenzene may be selectively hydrogenated in the presence of alkylnaphthalene.

By the use of the "A" type zeolite as the carrier for hydrogenation activity, the ability to obtain specific hydrogenation reactions of chain di-olefins in admixture with branch-chain di-olefin has been noted. The method is applicable as well to acetylenic or mono-olefinic structures. For example normal butylene may be hydrogenated from a mixture with isobutylene. Such a step of selective catalytic conversion is often useful in place of a non-chemical process of separation. Thus, the selective hydrogenation of normal butylene in contrast to iso-butylene may be practiced preparatory to hydration of a butylene stream for the purpose of preparing only tertiary butanol.

The same principle may be applied to selective hydrogenation of organic compounds other than hydrocarbons, as for example with the selective reduction of aldehydes to primary alcohols from a mixture of aldehydes and ketones.

Just as the foregoing examples indicate numerous applications of reactant selective chemical conversions, a large number of applications produce selective conversions is contemplated.

Thus, in the production of vinylacetylene from acetylene the production of higher molecular weight polymers may be suppressed. Such restrictive effects on molecular growth may be used in other reaction systems normally subject to successive polymerization of molecular units.

Similarly, in the alkylation type addition of olefin to aromatic rings in the presence of a catalyst base having approximately 10 A. unit crystal channels, the number of alkyl additions may be restricted, as well as their isomeric position, inasmuch as minimum molecular size will depend on the number and also the position of the substituent.

In addition reactions to 1-olefins it is well-known that group HR will normally be introduced with the hydrogen (H), adding on the terminal carbon atom. As a result, the group R will constitute a protrusion on the side of the otherwise linear molecules. Catalysts using an "A" type crystalline zeolite as the base structure are not penetrable by such addition products. However, it will be noted that the products of any "abnormal" addition, leaving the R group on a terminal carbon atom results in linear compounds which can still pass such a crystal. Sometimes the rule of addition which teaches the normal mode of addition is called the Markownikoff rule. However, there are compounds and reactions known which lead to "anti-Markownikoff" additions. A classic example is the addition of HBR to an olefin which may proceed in both manners. In the development of organic chemistry it has been recognized that the direction of addition is influenced by the nature of the substituent located on the molecule in the vicinity of the olefinic bond, and accordingly mixed-type additions as well as strictly anti-Markownikoff additions occur on a number of compounds. For example, this is true for various fluorohydrocarbons containing double bonds. In accordance with this invention, the addition of hydrides suc has HBr, HCl, HI, HSH, and HOH may be directed specifically to the abnormal or anti-Markownikoff addition products by catalyzing the same within zeolites having a pore size of approximately 5 A. units. In such directed addition reaction, the use of minor amounts of free-radical generating substances also accessible to the crystal interstices may be added as promoters.

There are contemplated other cases of product selectivity which lead to an apparent selectivity towards specific reactants; in the hydration, or in "normal" addition reactions of hydrogen halides or in the halogenation of ethylene in admixtures with higher molecular weight olefins, only the products from ethylene will have no molecular protrusion on the skeleton, but will alone remain essentially linear molecules. It is believed, therefore, that the present invention may also be applied to such selective reactions of ethylene in the presence of higher molecular weight olefins.

We claim:

1. A process for selectively conducting an organic chemical reaction which comprises carrying out a reaction involving contact of at least two molecular species of differing shape with a crystalline aluminosilicate zeolite molecular sieve material, bearing within the interior thereof an added catalyst, introduced into the zeolite subsequent to formation thereof, and active in effecting conversion of at least one of said species contained within the pores of said zeolite, which zeolite has uniform interstitial dimensions sufficiently large to afford the release from said pores of the product of said conversion but sufficiently small to exclude from said product molecular species of larger size, effecting catalytic conversion of at least one of said species contained within the pores of said zeolite to a material chemically distinct therefrom and of a molecular shape capable of passing from the interior of said zeolite and simultaneously withdrawing, without substantial change in pressure of the system, the product so obtained from the resultant effluent stream.

2. A process for selectively conducting an organic chemical reaction which comprises passing a reaction mixture consisting of components of different molecular shapes over a crystalline aluminosilicate zeolite molecular sieve material having uniform interstitial dimensions sufficiently large to admit at least one of said components but sufficiently small to exclude at least one remaining component and bearing within the interior thereof an added catalyst, active in promoting said reaction, introduced into the zeolite subsequent to formation thereof, effecting a catalytic conversion of the component material admitted to contact with said catalyst within the interior of said zeolite to convert the same to chemical species distinct from said admitted component and of a molecular shape capable of passing from the interior of said zeolite and simultaneously withdrawing, without substantial change in pressure of the system, said chemical species from the effluent stream passed over said zeolite.

3. A process as defined in claim 2, in which a hydrocarbon mixture is selectively cracked.

4. A process as defined in claim 2, in which the zeolite consists essentially of a metal aluminosilicate, the metal being selected from the group consisting of alkali and alkaline earth metals, said zeolite having undergone prior treatment with an ammonium compound and calcination thereafter to introduce surfaces possessing catalytically active acidity in the interior thereof.

5. A process for selectively conducting an organic chemical reaction which comprises passing a charge capable of conversion into products of different molecular sizes over a crystalline aluminosilicate zeolite molecular sieve material having uniform interstitial dimensions sufficiently large to release conversion products of lesser molecular weight but sufficiently small to prevent release of larger products of conversion and bearing within the interior thereof an added catalyst, active in promoting said reaction, introduced into the zeolite subsequent to formation thereof, effecting catalytic conversion of the charge material admitted to contact with said catalyst within the interior of said zeolite to convert the same to at least one chemical species distinct from said charge and of a molecular size capable of passing from the interior of said zeolite and simultaneously withdrawing, without substantial change in pressure of the system, said chemical species from the effluent stream passed over said zeolite.

6. A process as defined in claim 5, in which the zeolite has pores of about 5 Angstroms in diameter and in which the charge stock is a normal aliphatic hydrocarbon which is selectively cracked to straight chain hydrocarbons of lower molecular weight.

7. A process as defined in claim 2, in which, the reaction mixture comprises a mixture of normal and isomeric alcohols and in which the normal alcohol having at least 3 carbon atoms is selectively dehydrated at a temperature of between about 200° F. and about 650° F., and in which the zeolite has pores of about 5 Angstroms in diameter, whereby the normal alcohol component of the reaction mixture is admitted into the interior of said zeolite to the exclusion of the isomeric alcohol component.

8. A process as defined in claim 7, in which the reaction mixture comprises normal propyl alcohol and isopropyl alcohol.

9. A process as defined in claim 7, in which the reaction mixture comprises normal butyl alcohol and isobutyl alcohol.

10. A process as defined in claim 2, in which the reaction mixture comprises a mixture of hydrogenatable organic compounds of different molecular shapes together with hydrogen, the zeolite having a pore size sufficiently large to admit at least one of said organic compounds but sufficiently small to exclude at least one of the remaining organic compounds, and bearing within the interior thereof a hydrogenation catalyst.

11. The process of claim 10, wherein the hydrogenation catalyst is platinum.

12. A process as defined in claim 10, in which the reaction mixture comprises an unsubstituted aromatic compound in admixture with at least one polysubstituted aromatic compound, the zeolite having a pore size of approximately 10 to 13 Angstroms in diameter whereby the unsubstituted aromatic component is admitted into the interior of said zeolite to the exclusion of the polysubstituted aromatic component.

13. A process for selectively suppressing polymer formation in an organic chemical reaction normally susceptible thereto which comprises passing a charge capable of conversion into products of differing molecular size including a high molecular weight polymer and at least one product of smaller size over a crystalline aluminosilicate zeolite molecular sieve material bearing within the interior thereof an added catalyst, active in promoting said reaction introduced into the zeolite subsequent to formation thereof, said zeolite having uniform interstitial dimensions sufficiently large to release the conversion products of lesser molecular size but sufficiently small to prevent release of said polymer, effecting catalytic conversion of the charge making contact with said catalyst within the interior of said zeolite to convert the same to at least one product chemically distinct from said charge and of a molecular shape, capable of passing from the interior of said zeolite and simultaneously withdrawing, without substantial change in pressure of the system, the product so obtained from the resultant effluent stream.

14. A process as defined in claim 10, in which piperylene is selectively removed from admixture with isoprene, the zeolite having pores of about 5 Angstroms in diameter.

References Cited in the file of this patent

UNITED STATES PATENTS

| | | |
|---|---|---|
| 1,840,450 | Jaeger et al. | Jan. 12, 1932 |
| 1,910,837 | Jaeger | May 23, 1933 |
| 1,914,722 | Jaeger | June 20, 1933 |
| 2,253,285 | Connolly | Aug. 19, 1941 |
| 2,375,756 | Bates | May 15, 1945 |
| 2,694,673 | Kimberlin et al. | Nov. 16, 1954 |
| 2,859,256 | Hess et al. | Nov. 4, 1958 |
| 2,904,607 | Mattox et al. | Sept. 15, 1959 |
| 2,971,904 | Gladrow et al. | Feb. 14, 1961 |
| 3,008,943 | Guyer | Nov. 14, 1961 |

UNITED STATES PATENT OFFICE
CERTIFICATE OF CORRECTION

Patent No. 3,140,322                                July 7, 1964

Vincent J. Frilette et al.

It is hereby certified that error appears in the above numbered patent requiring correction and that the said Letters Patent should read as corrected below.

Column 1, lines 66 to 68, for the upper right-hand portion of the formula reading ".$xH_2O$" read -- .$zH_2O$ --; column 7, line 68, for "(10+ $Al_2O_3$-90% $SiO_2$)" read -- (10% $Al_2O_3$-90% $SiO_2$) --; column 8, line 51, in the box, for the first "$CH_2$" read -- $CH_3$ --; column 11, line 34, for "selectively" read -- selectivity --.

Signed and sealed this 29th day of December 1964.

(SEAL)
Attest:

ERNEST W. SWIDER                              EDWARD J. BRENNER
Attesting Officer                                       Commissioner of Patents